United States Patent
Smyers

(10) Patent No.: US 6,298,406 B1
(45) Date of Patent: Oct. 2, 2001

(54) METHOD OF AND APPARATUS FOR DETECTING DIRECTION OF RECEPTION OF BUS PACKETS AND CONTROLLING DIRECTION OF TRANSMISSION OF BUS PACKETS WITHIN AN IEEE 1394 SERIAL BUS NODE

(75) Inventor: Scott D. Smyers, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/953,879

(22) Filed: Oct. 24, 1997

(51) Int. Cl.[7] ..................................... G06F 13/40
(52) U.S. Cl. ................... 710/129; 710/126; 710/107; 710/131
(58) Field of Search ................. 710/107, 129, 710/131, 36, 37–38, 22, 33, 58, 60, 62–64, 72–74, 126, 127, 110; 709/208, 239, 249, 252, 302

(56) References Cited

U.S. PATENT DOCUMENTS

| | | | |
|---|---|---|---|
| 5,305,384 | * 4/1994 | Ashby et al. | 380/29 |
| 5,305,385 | 4/1994 | Schanning | 380/49 |
| 5,504,757 | * 4/1996 | Cook et al. | 370/84 |
| 5,506,838 | * 4/1996 | Flanagan | 370/54 |
| 5,509,126 | * 4/1996 | Oprescu et al. | 710/127 |
| 5,528,584 | * 6/1996 | Grant et al. | 370/58.2 |
| 5,579,486 | * 11/1996 | Oprescu et al. | 709/200 |
| 5,640,393 | 6/1997 | Lo et al. | 370/392 |
| 5,649,108 | * 7/1997 | Spiegel et al. | 709/227 |
| 5,689,644 | * 11/1997 | Chou et al. | 709/200 |
| 5,754,789 | * 5/1998 | Nowatzyk et al. | 710/233 |
| 5,862,338 | * 1/1999 | Walker et al. | 709/224 |
| 5,883,621 | * 3/1999 | Iwamura | 345/327 |
| 5,919,261 | * 7/1999 | Aoki et al. | 713/300 |
| 5,923,673 | * 7/1999 | Henrikson | 371/20.1 |
| 5,940,600 | * 8/1999 | Staats et al. | 710/107 |
| 5,948,080 | * 9/1999 | Baker | 710/37 |
| 5,953,511 | * 9/1999 | Sescila, III et al. | 710/129 |
| 6,002,675 | * 12/1999 | Ben-Michael et al. | 370/315 |
| 6,038,625 | * 3/2000 | Ogino et al. | 710/104 |
| 6,131,119 | * 10/2000 | Fukui | 709/224 |
| 6,157,951 | * 12/2000 | Vasa | 709/223 |

OTHER PUBLICATIONS

IEEE P1394: Standard for a High Performance Serial Bus, Draft 8.0v2, Jul. 7, 1995.

* cited by examiner

*Primary Examiner*—Robert Beausoleil
*Assistant Examiner*—Raymond N Phan
(74) *Attorney, Agent, or Firm*—Haverstock & Owens LLP

(57) ABSTRACT

A node on a bus structure includes a physical interface to the bus structure. The physical interface determines the port on which an inbound bus packet is received and transmits an outbound bus packet only on an appropriate port connected to the destination node. When receiving a bus packet, the physical interface determines if the port on which the packet was received is a secure port. If it is determined that the packet was received on a secure port, the packet is then dumped to a direct memory access channel where the packet is processed as usual without requiring processor intervention. If the packet was received on an unsecure port, the packet is dumped to a general receive area and the processor is interrupted. The processor then examines the packet to determine whether the packet can be processed without affecting the security of the node. When transmitting a bus packet, the port to which the destination node of the bus packet is connected is determined. The bus packet is then only transmitted on this destination port while the other ports within the physical interface circuit are held busy.

19 Claims, 4 Drawing Sheets

METHOD OF AND APPARATUS FOR DETECTING DIRECTION OF RECEPTION OF BUS PACKETS AND CONTROLLING DIRECTION OF TRANSMISSION OF BUS PACKETS WITHIN AN IEEE 1394 SERIAL BUS NODE

FIELD OF THE INVENTION

The present invention relates to the field of receiving and transmitting bus packets over an IEEE 1394 serial bus node. More particularly, the present invention relates to the field of determining the direction from which bus packets are received and controlling the direction to which bus packets are transmitted.

BACKGROUND OF THE INVENTION

The IEEE standard, "P1394 Standard For A High Performance Serial Bus," Draft 8.0v2, Jul. 7, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

Within the IEEE 1394 serial bus protocol there is a self-ID process which is used by the bus manager node within a bus structure to build a topology map of the nodes within the bus structure. This self-ID process determines the physical topology of the nodes on the IEEE 1394 serial bus network due to their port connections. From each port it is determined if there is a connection and if the connection is to a child or parent node. During this self-ID process, all of the physical connections are assigned a direction pointing towards the root node. The direction is set by labeling each connected port as either a parent port or a child port. A parent port is a port connected to a node closer to the root node than the reporting node. A child port is a port connected to a node further from the root node than the reporting node. From these relationships the bus manager node can determine the physical topology of the devices connected to the IEEE 1394 serial bus network. In this manner, a node is able to determine the devices which are connected to each of its ports.

IEEE 1394 asynchronous communications are addressed to the device to which they are being transmitted. When transmitting an asynchronous packet over the IEEE 1394 serial bus network, the packet is transmitted over each of the connected ports from the originating device. The packet is then transmitted to each intermediate device within the network, in turn, until it is received by the destination device to which it was addressed. When received 1 by the intermediate devices, the packet is received on one of the ports of the intermediate device. The intermediate device then rebroadcasts the packet on the connected non-receiving ports.

The IEEE 1394 serial bus can be used to connect many different devices together within a network, as described above. These devices can be coupled together within the same office or house or can be spread out over a bigger facility such as an office building or school. In some applications of the IEEE 1394 serial bus a device is coupled to the bus structure and cannot control the types of devices coupled to the IEEE 1394 serial bus and therefore cannot control the security of the IEEE 1394 serial bus network. In such a situation the device cannot prevent other devices coupled to the IEEE 1394 bus structure from monitoring or capturing communications which are transmitted from or received by the device. There is presently no manner to determine if a device is coupled to the IEEE 1394 serial bus in order to snoop on communications between other nodes or otherwise jeopardize the security of the IEEE 1394 serial bus network. These concerns also include fear of malicious nodes "spoofing" or acting in place of, other nodes connected to the IEEE 1394 serial bus network. There is presently nothing to stop intermediate nodes from copying transmissions as they pass them along on the IEEE 1394 serial bus to the destination node. There is also nothing to stop devices from sending false communications to a device in order to solicit information which the device would otherwise not send. Accordingly, security on an IEEE 1394 serial bus structure in such environments is of great concern.

What is needed is a method and apparatus for detecting the direction from which bus packets were received. What is further needed is a method and apparatus for controlling the direction of transmission from a node.

SUMMARY OF THE INVENTION

A node on a bus structure includes a physical interface to the bus structure. The physical interface determines the port on which an inbound bus packet is received and transmits an outbound bus packet only on an appropriate port connected to the destination node. When receiving a bus packet, the physical interface determines if the port on which the packet was received is a secure port. If it is determined that the packet was received on a secure port, the packet is then dumped to a direct memory access channel where the packet is processed as usual without requiring processor intervention. If the packet was received on an unsecure port, the packet is dumped to a general receive area and the processor is interrupted. The processor then examines the packet to determine whether the packet can be processed without affecting the security of the node. When transmitting a bus packet, the port to which the destination node of the bus packet is connected is determined. The bus packet is then only transmitted on this destination port while the other ports within the physical interface circuit are held busy.

DETAILED DESCRIPTION OF THE PREFERRED EMBODIMENT:

A node on an IEEE 1394 serial bus network includes a physical interface which determines the port on which a bus packet was received and transmits a bus packet only on an appropriate port connected to a destination node while holding the remaining ports busy. When receiving a bus packet, the physical interface prepends information to the bus packet regarding the port on which the bus packet was received. The physical interface then sends the prepended information and the bus packet to the link function within the interface circuit. The link function then determines if the port on which the bus packet was received is a secure port. If it is determined that the packet was received on a secure port, the packet is then dumped by the link function to a direct memory access (DMA) channel where the packet is processed as usual without requiring processor intervention. If the packet was received on an unsecure port, the link function then dumps the packet to a general receive area and interrupts the processor. The processor, using system software, then examines the packet to determine whether the packet can be processed without affecting the security of the node.

When transmitting a bus packet, the link function uses a topology map generated during the self-ID process to determine the port which is connected to the node to which a bus packet to be transmitted is addressed. The link function then prepends information to the bus packet regarding the port on which the bus packet is to be transmitted. The link function sends the prepended information and the bus packet to the physical interface for transmission over the bus structure. The physical interface then transmits the bus packet on the specified port only and holds the other ports within the node busy, in order to occupy the bus while the packet is being transmitted. In this manner, the bus packet is transmitted only in the direction of the node receiving the bus packet, thereby reducing the likelihood that the bus packet will be intercepted by another node.

Figure 2:
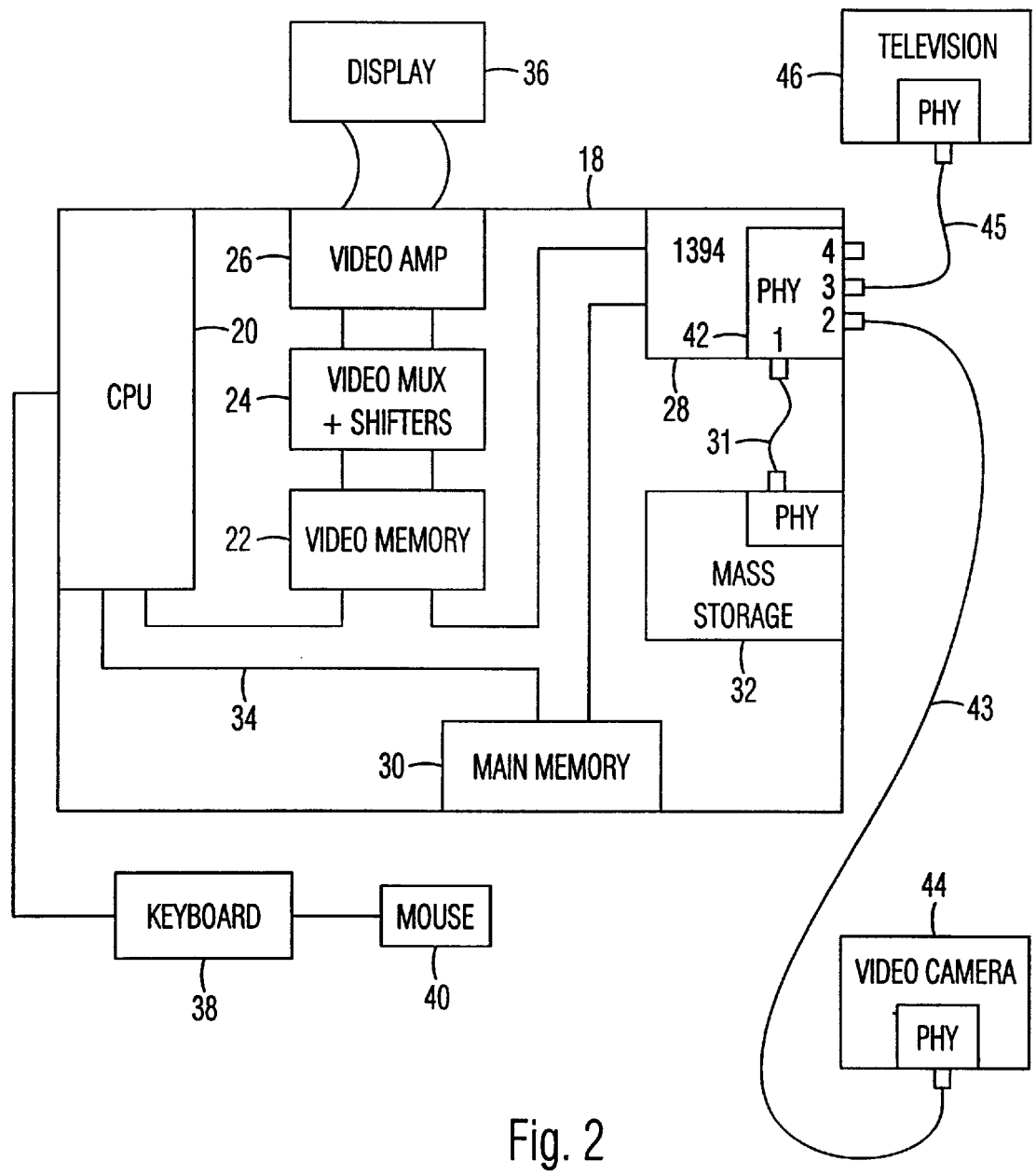
FIG. 2 illustrates a block diagram of an exemplary personal computer system including a node according to the present invention.

While any appropriate device can implement a node according to the present invention, an exemplary computer system 18 implementing such a node is illustrated in FIG. 2. Preferably, the node of the present invention is coupled to an IEEE 1394 serial bus network. However, it should be apparent to those skilled in the art that the node of the present invention can be configured to couple to any appropriate bus or network structure. The computer system 18 includes a central processor unit (CPU) 20, a main memory 30, a video memory 22 and an IEEE 1394 interface circuit 28, all coupled together by a conventional bidirectional system bus 34. The interface circuit 28 includes a physical interface circuit 42 for sending and receiving communications on the IEEE 1394 serial bus network. The physical interface circuit 42 includes ports 1–4 which are preferably each configured to be coupled to IEEE 1394 cables connected to other devices. Within the computer system 18, the physical interface circuit 42 is coupled to a mass storage device 32, through the port 1, by the IEEE 1394 serial bus cable 31. Outside of the computer system 18, the physical interface circuit 42 is also coupled to a television 46, through the port 3, by the IEEE 1394 serial bus cable 45 and to a video camera 44, through the port 2, by the IEEE 1394 serial bus cable 43. The port 4 on the physical interface circuit 42 is left unconnected in the exemplary system illustrated in FIG. 2.

Figure 1:
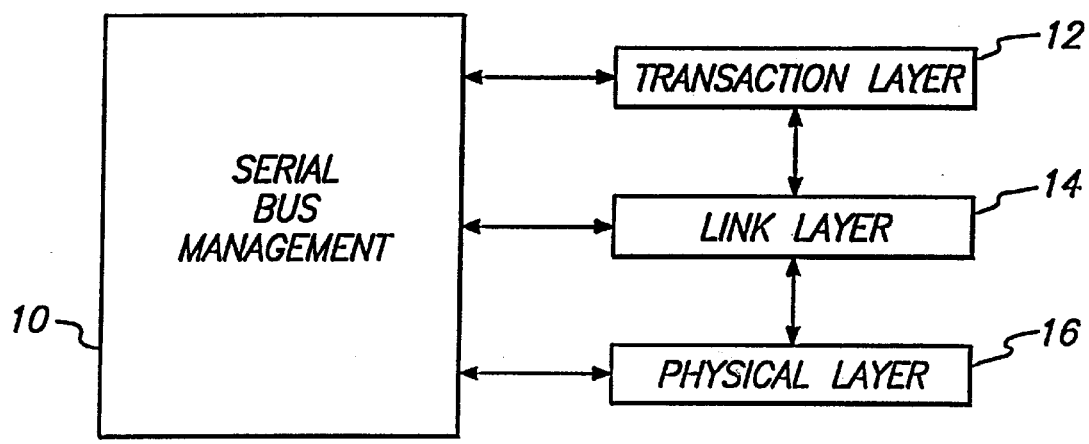
FIG. 1 illustrates a protocol defined by the IEEE 1394 standard.

The interface circuit 28 includes a serial bus management block 10, a transaction layer 12, a link layer 14 and a physical layer 16 as illustrated in FIG. 1. In the preferred embodiment of the present invention, the interface circuit 28 is implemented on an IEEE 1394 interface card within the computer system 18. However, it should be apparent to those skilled in the art that the interface circuit 28 can be implemented within the computer system 18 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22 and the interface circuit 28.

The computer system 18 is also coupled to a number of peripheral input and output devices including a keyboard 38, a mouse 40 and an associated display 36. The keyboard 38 is coupled to the CPU 20 for allowing a user to input data and control commands into the computer system 18. A conventional mouse 40 is coupled to the keyboard 38 for manipulating graphic images on the display 36 as a cursor control device.

A port of the video memory 22 is coupled to a video multiplex and shifter circuit 24, which in turn is coupled to a video amplifier 26. The video amplifier 26 drives the display 36. The video multiplex and shifter circuitry 24 and the video amplifier 26 convert pixel data stored in the video memory 22 to raster signals suitable for use by the display 36.

When receiving a bus packet, the physical interface circuit 42 prepends information to the bus packet, referencing the port on which the bus packet was received. Preferably, this information is added as a quadlet to the front of each packet received by the physical interface circuit 42. This added quadlet includes a direction field which contains a "1" in the position corresponding to the port on which the bus packet was received. No changes are made to the bus packet itself. Both the prepended quadlet and the bus packet are sent from the physical interface circuit 42 to the link function within the interface circuit 28.

When receiving a bus packet from the physical interface circuit 42, the link function is aware that the connection on port I to the mass storage device 32 is within the computer system 18 and is therefore secure. Accordingly, any bus packet received by the interface circuit 28 from the mass storage device 32, directed to an address within the computer system 18, is dumped directly from the interface circuit 28 to a DMA channel and appropriately processed without requiring any intervention by the CPU 20. The ports 2 and 3 on the physical interface circuit 42 are coupled outside of the computer system 18 and are therefore unsecure. Communications received by the physical interface circuit 42 on the ports 2 and 3, directed to an address within the computer system 18, are dumped to a general receive area. After receiving such communications from the unsecure ports 2 and 3, the interface circuit 28 then interrupts the CPU 20. The CPU 20 using system software examines the bus packet within the general receive area to determine whether the packet can be processed without affecting the security of the computer system. If the CPU 20 determines that the bus packet can be processed without affecting the security of the computer system, that bus packet is then processed. Otherwise, the CPU 20 discards the bus packet.

The physical interface circuit 42 will retransmit received bus packets without determining if the bus packets were received on a secure port. These bus packets are retransmitted on the ports connected outside of the computer system, other than the port on which the communication was received. For example, a communication received from the television 46 on the port 3 is retransmitted from the port 2 to the video camera 44.

The interface circuit 28 can also determine that a port connected to devices outside the computer system 18 is secure. However, this determination must be made after each bus reset.

When transmitting a bus packet, the link function of the interface circuit 28 determines the port on which the bus packet is to be transmitted. This is done by comparing the address of the device to which the bus packet is being sent to the topology map generated during the self-ID process. The link function then prepends a quadlet of information specifying the port on which the bus packet is to be transmitted. Preferably, this quadlet of information includes a direction field which contains a "1" in the position corresponding to the port on which the bus packet is to be transmitted. No changes are made to the bus packet itself. The link function then sends the prepended quadlet and the bus packet to the physical interface circuit 42 to be transmitted. The physical interface circuit 42 transmits the bus packet on the appropriate port, as specified within the prepended quadlet, while simultaneously holding the other ports within the physical interface circuit 42 busy in order to capture the IEEE 1394 serial bus structure during transmission. Preferably, the physical interface circuit 42 holds the other ports busy by sending a data prefix signal on the ports for which the direction field contains a "0" in the corresponding position.

Figure 3:
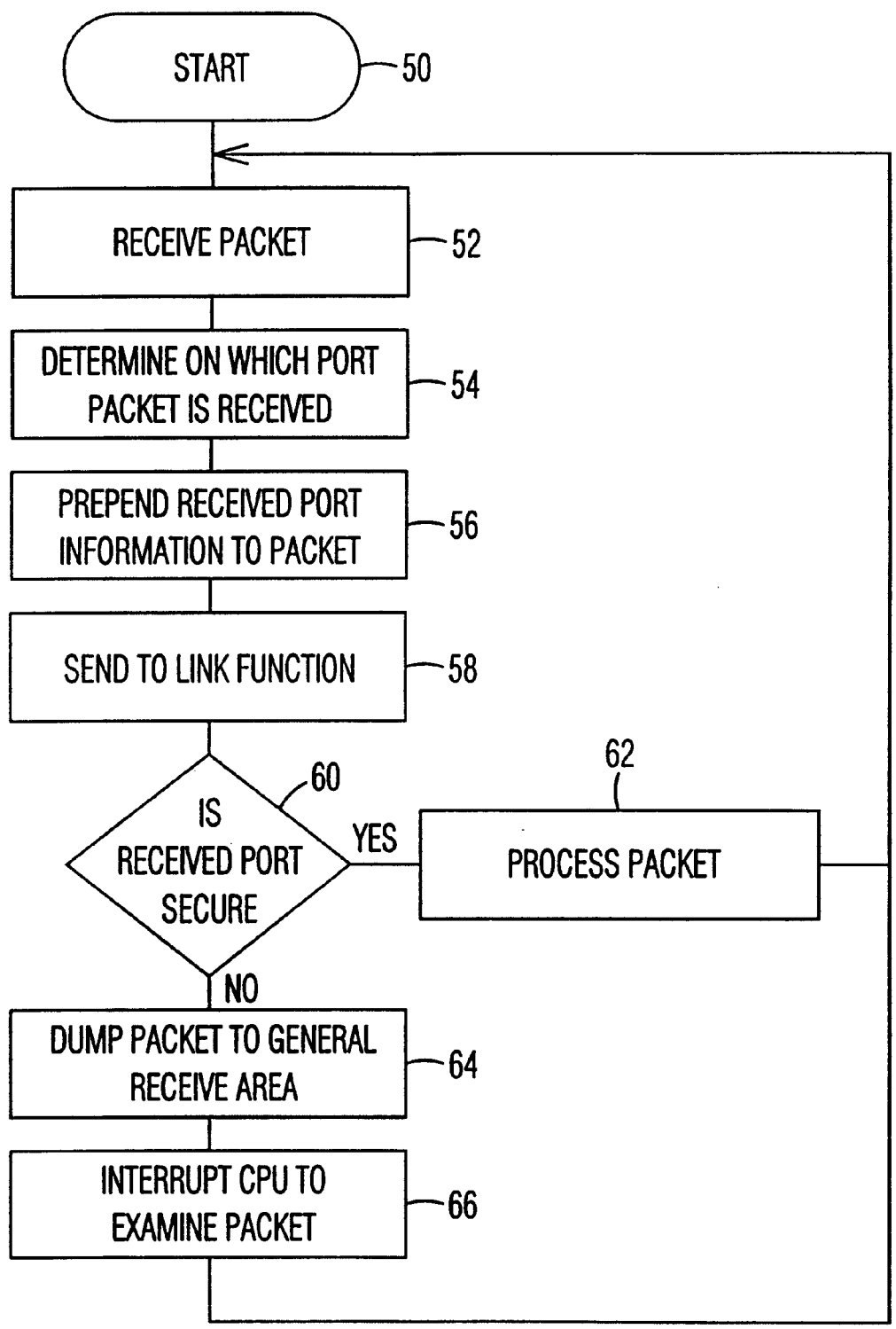
FIG. 3 illustrates a flow chart illustrating the process of receiving a bus packet according to the present invention.

A flow chart illustrating the steps necessary to receive a packet, within the preferred embodiment of the present invention, is illustrated in FIG. 3. The receiving process starts at the block 50. A bus packet directed to an address within the computer system 18 is received by the physical interface circuit 42 at the block 52. The physical interface circuit 42 then determines on which port the bus packet was received at the block 54. At the block 56, the physical interface circuit 42 prepends the quadlet of information, representing the port on which the bus packet was received, to the bus packet. The prepended quadlet and the bus packet are then sent from the physical interface circuit 42 to the link function within the interface circuit 28 at the block 58.

At the block 60, the link function examines the prepended quadlet and determines if the port on which the packet was received is secure. If the port on which the packet was received is secure, then the packet is dumped from the interface circuit 28 to a DMA channel where the packet is processed without requiring processor intervention at the block 62. After the packet is processed at the block 62, the system jumps back to the block 52 to receive the next packet. If the port on which the packet was received is not secure, the packet is dumped from the interface circuit 28 into a general receive area at the block 64. The interface circuit 28 will then interrupt the CPU 20 to examine the packet and determine if the packet can be processed without affecting the security of the node at the block 66. After interrupting the CPU 20 at the block 66, the system jumps back to the block 52 to receive the next packet.

Figure 4:
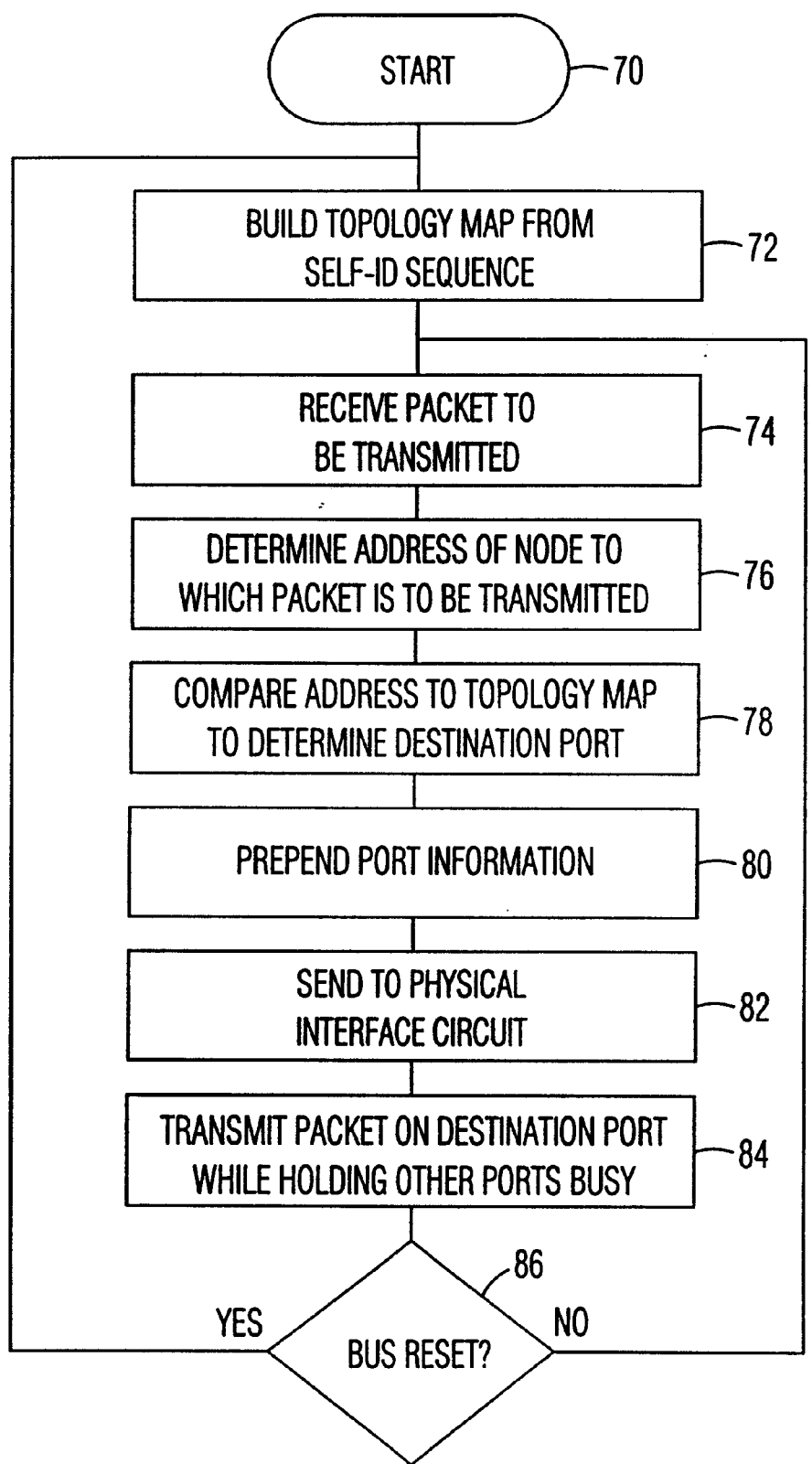
FIG. 4 illustrates a flow chart illustrating the process of transmitting a bus packet according to the present invention.

A flow chart illustrating the steps necessary to transmit a packet, within the preferred embodiment of the present invention, is illustrated in FIG. 4. The transmitting process starts at the block 70. A topology map is built by the interface circuit 28 at the block 72, using the packets received during the self-ID process of the IEEE 1394 protocol. A bus packet directed to an address on the IEEE 1394 serial bus structure is received by the link function within the interface circuit 28 at the block 74. The link function then determines the address of the node to which the packet is to be transmitted at the block 76. That address is then compared to the topology map in order to determine on which port the bus packet is to be transmitted at the block 78. Once the port is determined, the port information is prepended to the bus packet at the block 80. Both the quadlet including the port information and the bus packet are then transmitted from the link function to the physical interface circuit 42 at the block 82. The bus packet is then transmitted only on the port determined at the block 78, while the other ports are held busy at the block 84. As described above, preferably the other ports are held busy by sending a data prefix signal on each of the other ports thereby occupying the bus structure during transmission. The interface circuit 28 then determines if there has been a bus reset at the block 86. If there has been a bus reset, the system jumps to the block 72 in order to build the topology map for the new bus configuration. Otherwise, the system jumps to the block 74 in order to receive the next bus packet to be transmitted.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394 serial bus structure, the present invention can also be implemented on appropriately configured nodes within other bus structures.

I claim:

1. A method of receiving bus packets within a node on a bus structure having a plurality of ports, comprising the steps of:
   a. receiving a bus packet on one of the plurality of ports;
   b. determining if the bus packet is directed to the node;
   c. determining on which port the bus packet was received, if the bus packet is directed to the node; and
   d. communicating the port on which the bus packet was received with the bus packet.

2. The method as claimed in claim 1 further comprising the steps of:
   a. determining if the port on which the bus packet was received is a secure port; and
   b. processing the bus packet if the port on which the bus packet was received is a secure port.

3. The method as claimed in claim 2 wherein the step of communicating the port includes prepending information about the port on which the bus packet was received, to the bus packet.

4. The method as claimed in claim 3 further comprising the step of further analyzing the bus packet if the port on which the bus packet was received is not a secure port.

5. The method as claimed in claim 4 wherein the bus structure is an IEEE 1394 serial bus network.

6. The method as claimed in claim 5 further comprising the step retransmitting the bus packet, if the bus packet is not directed to the node.

7. The method as claimed in claim 6 wherein the step of processing includes sending the bus packet to a DMA channel and processing the bus packet without processor intervention.

8. A method of transmitting a bus packet from one of a plurality of ports within a node on a bus structure, comprising the steps of:
   a. determining on which port a destination node of a current bus packet is coupled;
   b. transmitting the current bus packet on the port to which the destination node is coupled; and
   c. holding ports within the plurality of ports busy, which are not the port to which the destination node is coupled, while the step of transmitting is performed.

9. The method as claimed in claim 8 wherein the step of determining includes automatically building a topology map of nodes within the bus structure.

10. The method as claimed in claim 9 wherein the step of determining further includes comparing an address of the destination node to the topology map for determining on which port the destination node is coupled.

11. The method as claimed in claim 10 wherein the bus structure is an IEEE 1394 serial bus structure.

12. The method as claimed in claim 8 further comprising the step of prepending information about the port to which the destination node is coupled to the bus packet.

13. An interfacing circuit configured for coupling a node to a bus structure for interfacing the node to the bus structure, comprising:
   a. a plurality of ports each configured for coupling to the bus structure, each port having a corresponding direction on the bus structure; and
   b. a determining circuit coupled to the plurality of ports for determining on which port a received bus packet is received, wherein the determining circuit sends information representing the port on which the received bus packet is received with the received bus packet.

14. The interfacing circuit as claimed in claim 13 further comprising a transmitting circuit coupled to the plurality of ports for transmitting an outbound bus packet on a predetermined one of the plurality of ports while holding remaining ports within the plurality of ports busy.

15. The interfacing circuit as claimed in claim 14 wherein the transmitting circuit also compares an address of the predetermined one of the plurality of ports to a topology map of the nodes on the bus structure to determine the predetermined one of the plurality of ports.

16. The interfacing circuit as claimed in claim 15 wherein the bus structure is an IEEE 1394 serial bus network.

17. The interfacing circuit as claimed in claim 16 further comprising a processing circuit coupled to the interfacing circuit for determining if the received bus packet was received on a secure port.

18. A node on a bus structure for receiving and transmitting bus packets to other nodes on the bus structure comprising:
   a. an interfacing circuit for interfacing the node to the bus structure, the interfacing circuit including:
      i. a plurality of ports each configured for coupling to the bus structure, each port having a corresponding direction on the bus structure;
      ii. a determining circuit coupled to the plurality of ports for determining on which port a received bus packet is received, wherein the determining circuit sends information representing the port on which the received bus packet is received with the received bus packet; and
      iii. a transmitting circuit coupled to the plurality of ports for transmitting an outbound bus packet on a predetermined one of the plurality of ports while holding remaining ports within the plurality of ports busy; and
   b. a processing circuit coupled to the interfacing circuit for determining if the received bus packet was received on a secure port.

19. The node as claimed in claim 18 wherein the bus structure is an IEEE 1394 serial bus network.

* * * * *

UNITED STATES PATENT AND TRADEMARK OFFICE
CERTIFICATE OF CORRECTION

PATENT NO.   : 6,298,406 B1
DATED        : October 2, 2001
INVENTOR(S)  : Scott D. Smyers It is certified that error appears in the above-identified patent and that said Letters Patent is hereby corrected as shown below:

<u>Title page,</u>
Item [56], References Cited, the following U.S. PATENT DOCUMENTS need to be added:

| | | | |
|---|---|---|---|
| -- 5,289,460 | 2/22/94 | Drake, Jr. et al. | 370/17 |
| 5,394,556 | 2/28/95 | Oprescu | 395/800 |
| 5,444,709 | 8/22/95 | Riddle | 370/94.1 |
| 5,561,670 | 10/1/96 | Hoffert et al. | 370/94.1 |
| 5,606,664 | 2/25/97 | Brown et al. | 395/200.1 |
| 5,623,610 | 4/22/97 | Knoll et al. | 395/281 |
| 5,694,335 | 12/2/97 | Hollenberg | 364/514 C |
| 5,715,475 | 2/3/98 | Munson et al. | 395/830 |
| 5,724,517 | 3/3/98 | Cook et al. | 395/200.57 --. |

The following OTHER PUBLICATIONS need to be added:
-- "A Bus on a Diet - The Serial Bus Alternative, An Introduction to the P1394 High Performance Serial Bus," Michael Teener, pages 316-321, February 24, 1992.
"The IEEE-1394 High Speed Serial Bus" R.H.J. Bloks, Philips Research Laboratories, Vol. 50, pages 209-216, 1996. --.

<u>Column 2,</u>
Line 39, after "When received", delete "1".

<u>Column 5,</u>
Line 18, replace "port I" with -- port 1 --.

Signed and Sealed this

Ninth Day of July, 2002

*Attest:*

*Attesting Officer*

JAMES E. ROGAN
*Director of the United States Patent and Trademark Office*